United States Patent
Warren et al.

(10) Patent No.: US 9,261,287 B2
(45) Date of Patent: Feb. 16, 2016

(54) ADAPTIVE POWER STEALING THERMOSTAT

(75) Inventors: Daniel Adam Warren, San Francisco, CA (US); Ian C. Smith, Palo Alto, CA (US); Edwin H. Satterthwaite, Jr., Palo Alto, CA (US); Joseph E. Palmer, San Jose, CA (US)

(73) Assignee: Google Inc., Mountain View, CA (US)

( * ) Notice: Subject to any disclaimer, the term of this patent is extended or adjusted under 35 U.S.C. 154(b) by 807 days.

(21) Appl. No.: 13/267,871

(22) Filed: Oct. 6, 2011

(65) Prior Publication Data

US 2012/0199660 A1  Aug. 9, 2012

Related U.S. Application Data

(60) Provisional application No. 61/415,771, filed on Nov. 19, 2010, provisional application No. 61/429,093, filed on Dec. 31, 2010.

(51) Int. Cl.
*G05D 23/19* (2006.01)
*H02M 5/02* (2006.01)
(Continued)

(52) U.S. Cl.
CPC .......... *F24F 11/001* (2013.01); *B01D 46/0086* (2013.01); *F24D 19/10* (2013.01); *F24D 19/1084* (2013.01); *F24F 11/0009* (2013.01); *F24F 11/0012* (2013.01); *F24F 11/0086* (2013.01); *G05D 23/19* (2013.01); *G05D 23/1902* (2013.02); *G05D 23/1917* (2013.01);
(Continued)

(58) Field of Classification Search
CPC .............. F24D 19/1084; F24F 11/0012; F24F 2011/0068; F24F 2011/0073; G05D 23/1902; G05D 23/1917; H02M 5/293

USPC .......... 700/278, 277, 275, 9, 1; 165/201, 200; 236/1 C, 1 R; 263/17
See application file for complete search history.

(56) References Cited

U.S. PATENT DOCUMENTS

| 4,157,506 A | 6/1979 | Spencer |
| 4,308,991 A | 1/1982 | Peinetti et al. |

(Continued)

FOREIGN PATENT DOCUMENTS

| EP | 207295 A1 | 1/1987 |
| EP | 510807 A2 | 10/1992 |

(Continued)

OTHER PUBLICATIONS

International Preliminary Report on Patentability mailed Apr. 8, 2014, for International Patent Application No. PCT/US2012/059111 filed Oct. 5, 2012, 10 pages.

(Continued)

*Primary Examiner* — Rexford Barnie
*Assistant Examiner* — Elim Ortiz
(74) *Attorney, Agent, or Firm* — Kilpatrick Townsend & Stockton LLP (57) ABSTRACT

An electronic thermostat and associated methods are disclosed for power stealing from an HVAC triggering circuit. The methods include making voltage measurements while controlling the amount of current drawn by the power stealing circuitry so as to determine a relationship that can be used to select how much current to draw during power stealing. Through the use of the described methods, the likelihood of inadvertent switching of the HVAC function (on or off) can be significantly reduced.

15 Claims, 7 Drawing Sheets

(51) Int. Cl.
*G05F 3/02* (2006.01)
*F24F 11/00* (2006.01)
*F24D 19/10* (2006.01)
*H04W 4/00* (2009.01)
*B01D 46/00* (2006.01)

(52) U.S. Cl.
CPC ........ *H04W 4/005* (2013.01); *F24F 2011/0052* (2013.01); *F24F 2011/0068* (2013.01); *F24F 2011/0073* (2013.01); *F24F 2011/0093* (2013.01); *Y10T 29/49826* (2015.01)

(56) References Cited

U.S. PATENT DOCUMENTS

| | | | |
|---|---|---|---|
| 4,528,459 A | 7/1985 | Wiegel | |
| 4,695,246 A | 9/1987 | Beilfuss et al. | |
| 4,842,510 A | 6/1989 | Grunden et al. | |
| 4,872,828 A | 10/1989 | Mierzwinski et al. | |
| 4,898,229 A | 2/1990 | Brown et al. | |
| 4,948,044 A | 8/1990 | Cacciatore | |
| 4,955,806 A | 9/1990 | Grunden et al. | |
| 5,107,918 A | 4/1992 | McFarlane et al. | |
| 5,127,464 A | 7/1992 | Butler et al. | |
| 5,158,477 A | 10/1992 | Testa et al. | |
| 5,175,439 A | 12/1992 | Haerer et al. | |
| 5,251,813 A | 10/1993 | Kniepkamp | |
| 5,255,179 A | 10/1993 | Zekan et al. | |
| 5,347,982 A | 9/1994 | Binzer et al. | |
| 5,352,930 A | 10/1994 | Ratz | |
| 5,381,950 A | 1/1995 | Aldridge | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,506,569 A | 4/1996 | Rowlette | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,646,349 A | 7/1997 | Twigg et al. | |
| 5,655,709 A | 8/1997 | Garnett et al. | |
| 5,697,552 A | 12/1997 | McHugh et al. | |
| 5,736,795 A | 4/1998 | Zuehlke et al. | |
| 5,903,139 A * | 5/1999 | Kompelien | 323/282 |
| 6,060,719 A | 5/2000 | DiTucci et al. | |
| 6,084,518 A | 7/2000 | Jamieson | |
| 6,089,310 A | 7/2000 | Toth et al. | |
| 6,205,041 B1 * | 3/2001 | Baker | 363/86 |
| 6,213,404 B1 | 4/2001 | Dushane et al. | |
| 6,222,719 B1 | 4/2001 | Kadah | |
| 6,275,160 B1 | 8/2001 | Ha | |
| 6,315,211 B1 | 11/2001 | Sartain et al. | |
| 6,336,593 B1 | 1/2002 | Bhatnagar | |
| 6,356,038 B2 | 3/2002 | Bishel | |
| 6,509,838 B1 | 1/2003 | Payne et al. | |
| 6,513,723 B1 | 2/2003 | Mueller et al. | |
| 6,566,768 B2 | 5/2003 | Zimmerman et al. | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| 6,798,341 B1 | 9/2004 | Eckel et al. | |
| 6,886,754 B2 | 5/2005 | Smith et al. | |
| 6,956,463 B2 | 10/2005 | Crenella et al. | |
| 7,174,239 B2 | 2/2007 | Butler et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,571,865 B2 | 8/2009 | Nicodem et al. | |
| 7,648,077 B2 | 1/2010 | Rossi et al. | |
| 7,673,809 B2 | 3/2010 | Juntunen | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,841,542 B1 | 11/2010 | Rosen | |
| 7,900,849 B2 | 3/2011 | Barton et al. | |
| 8,630,740 B2 * | 1/2014 | Matsuoka et al. | 700/276 |
| 2002/0074865 A1 * | 6/2002 | Zimmerman et al. | 307/125 |
| 2002/0181251 A1 * | 12/2002 | Kompelien | 363/17 |
| 2003/0037555 A1 | 2/2003 | Street et al. | |
| 2003/0064335 A1 | 4/2003 | Canon | |
| 2003/0090243 A1 * | 5/2003 | Atherton | 323/239 |
| 2003/0231001 A1 | 12/2003 | Bruning | |
| 2004/0012477 A1 * | 1/2004 | Engler et al. | 337/344 |
| 2004/0114399 A1 * | 6/2004 | Lincoln et al. | 363/56.02 |
| 2004/0120084 A1 | 6/2004 | Readio et al. | |
| 2004/0209209 A1 | 10/2004 | Chodacki et al. | |
| 2004/0245349 A1 | 12/2004 | Smith | |
| 2005/0043907 A1 | 2/2005 | Eckel et al. | |
| 2005/0145705 A1 | 7/2005 | Shah et al. | |
| 2005/0270151 A1 | 12/2005 | Winick | |
| 2006/0124759 A1 | 6/2006 | Rossi et al. | |
| 2006/0186214 A1 | 8/2006 | Simon et al. | |
| 2007/0045432 A1 | 3/2007 | Juntunen | |
| 2007/0095082 A1 | 5/2007 | Garrett et al. | |
| 2007/0114848 A1 * | 5/2007 | Mulhouse et al. | 307/43 |
| 2007/0115135 A1 * | 5/2007 | Mulhouse et al. | 340/644 |
| 2007/0131787 A1 | 6/2007 | Rossi et al. | |
| 2007/0228163 A1 | 10/2007 | Kennedy et al. | |
| 2007/0241203 A1 | 10/2007 | Wagner et al. | |
| 2007/0296280 A1 * | 12/2007 | Sorg et al. | 307/651 |
| 2008/0011736 A1 * | 1/2008 | Lenhart et al. | 219/412 |
| 2008/0015742 A1 | 1/2008 | Kulyk et al. | |
| 2008/0054082 A1 | 3/2008 | Evans et al. | |
| 2008/0094010 A1 | 4/2008 | Black | |
| 2008/0120420 A1 * | 5/2008 | Sima et al. | 709/229 |
| 2008/0147242 A1 | 6/2008 | Roher et al. | |
| 2008/0192635 A1 * | 8/2008 | Muench et al. | 361/5 |
| 2008/0222736 A1 * | 9/2008 | Boodaei et al. | 726/27 |
| 2009/0062970 A1 | 3/2009 | Forbes, Jr. et al. | |
| 2009/0099697 A1 | 4/2009 | Li et al. | |
| 2009/0140057 A1 | 6/2009 | Leen | |
| 2009/0194601 A1 | 8/2009 | Flohr | |
| 2009/0236433 A1 | 9/2009 | Mueller et al. | |
| 2009/0259713 A1 | 10/2009 | Blumrich et al. | |
| 2010/0006660 A1 | 1/2010 | Leen et al. | |
| 2010/0026379 A1 * | 2/2010 | Simard et al. | 327/540 |
| 2010/0070099 A1 | 3/2010 | Watson et al. | |
| 2010/0084482 A1 | 4/2010 | Kennedy et al. | |
| 2010/0182743 A1 | 7/2010 | Roher | |
| 2010/0193592 A1 | 8/2010 | Simon et al. | |
| 2011/0025257 A1 | 2/2011 | Weng | |
| 2011/0253796 A1 | 10/2011 | Posa et al. | |
| 2012/0199558 A1 * | 8/2012 | Faulkner | 218/143 |
| 2012/0248211 A1 | 10/2012 | Warren et al. | |
| 2012/0325919 A1 * | 12/2012 | Warren et al. | 236/1 C |
| 2013/0221117 A1 * | 8/2013 | Warren et al. | 236/1 C |
| 2013/0313331 A1 * | 11/2013 | Warren et al. | 236/1 C |

FOREIGN PATENT DOCUMENTS

| | | |
|---|---|---|
| EP | 660287 A1 | 6/1995 |
| EP | 690363 A2 | 1/1996 |
| EP | 2302326 A1 | 3/2011 |
| JP | 09298780 A | 11/1997 |
| WO | 2008054938 A2 | 5/2008 |
| WO | 2013052905 A1 | 4/2013 |

OTHER PUBLICATIONS

International Patent Application PCT/US2012/059111, International Search Report and Written Opinion, mailed Jan. 9, 2013 (15 pages).

\* cited by examiner

ADAPTIVE POWER STEALING THERMOSTAT

CROSS-REFERENCE To RELATED APPLICATIONS

This patent application claims the benefit of U.S. Prov. Ser. No. 61/415,771 filed Nov. 19, 2010; and of U.S. Prov. Ser. No. 61/429,093 filed Dec. 31, 2010, each of which is incorporated by reference herein. The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/033,573 and U.S. Ser. No. 29/386,021, filed Feb. 23, 2011; U.S. Ser. No. 13/034,666, U.S. Ser. No. 13/034,674 and U.S. Ser. No. 13/034,678 filed Feb. 24, 2011; U.S. Ser. No. 13/038,206 and U.S. Ser. No. 13/038,191filed Mar. 1, 2011; and U.S. Ser. No. 13/199,108, filed Aug. 17, 2011. Each of the above-referenced patent applications is incorporated by reference herein. The above-referenced patent applications are collectively referenced hereinbelow as "the commonly assigned incorporated applications."

FIELD

This invention relates generally to the monitoring and control of HVAC systems and/or for other systems for controlling household utilities, and/or resources. More particularly, embodiments of this invention relate facilitating power stealing or power harvesting in a control device such as a thermostat having a rechargeable battery.

BACKGROUND

Thermostats having electronics, such as programmable thermostats, may rely on an independent power source, such as a disposable battery. However, a disposable battery eventually needs to be replaced by the user. Electronic thermostats can also be powered directly from an HVAC system transformer such as using a 24 VAC "common" wire ("C-wire") from the transformer, but only if one is available. When provided, the C wire has the particular purpose of supplying power for an electronic thermostat. However, many HVAC installations do not have a C-wire provided to the thermostat. For such cases, many electronic thermostats have been designed to extract power from the transformer from the circuit used to turn on and off the HVAC function which is called "power stealing," "power sharing" or "power harvesting." The thermostat "steals," "shares" or "harvests" its power during the "OFF" or "inactive" periods of the heating or cooling system by allowing a small amount of current to flow through it into the load coil below its response threshold (even at maximum transformer output voltage). During the "ON" or "active" periods of the heating or cooling system the thermostat can be designed to draw power by allowing a small voltage drop across itself. Hopefully, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. Some thermostats are designed to be operable for a variety of power sources. For example, U.S. Pat. No. 6,886,754 discusses a thermostat operable from battery, common-wire or power-stealing depending upon the type of HVAC system the thermostat is installed with.

However, a trade-off inherently exists between drawing enough power during power stealing so as to provide adequate power for thermostat operation and drawing too much power such that the power stealing causes false switching: where the HVAC function unintentionally turns on, or activates, or unintentionally turns off. Determining how much current to draw during power stealing is also complicated by the wide variety of HVAC systems with which the thermostat may be installed, as well as the desire to design a thermostat that is relatively easy to install.

Some attempts have been made to decrease the power usage of the thermostat. For example, U.S. Pat. No. 7,755,220 discusses power stealing for a thermostat using a triac with FET control. The discussed electronic thermostat circuit topology attempts to minimize the current needed to control the thermostat outputs. However, for advanced and user-friendly functions that consume more power, greater amounts of power will need to be obtained through power stealing.

SUMMARY

According to some embodiments a method is described for harvesting power from an HVAC triggering circuit that includes a call switch (e.g. a relay) to turn on and turn off an HVAC function (such as heating or cooling). A thermostat connected to the HVAC triggering circuit uses the harvested power. The method includes making at least one measurement that is at least partially influenced by the amount of electrical current flowing through the call switch; and controlling the amount of power the thermostat harvests from the HVAC triggering circuit based at least in part on the measurement so as to reduce a likelihood of inadvertently switching the HVAC function on or off.

According to some embodiments, a second measurement is also made when a different amount of electrical current is flowing through the call switch such that a relationship between harvested current and voltage drop can be estimated. The amount of power the thermostat harvests can include selecting from two or more predetermined levels of harvesting current drawn by the thermostat. According to some embodiments, subsequent measurements can be made and the amount of current the thermostat harvests from the HVAC triggering circuit can be adjusted according to the subsequent measurements.

According to some embodiments, the described method occurs when the HVAC function is active, inactive, or both.

According to some embodiments, the power harvesting causes a drop in voltage across the call switch, the thermostat controls the current draw such that the harvesting results in the drop in voltage across the call switch to be less than about $8V_{RMS}$.

According to some embodiments, a thermostat is described for harvesting power from an HVAC triggering circuit that includes a call switch to turn on and turn off an HVAC function. The thermostat includes power stealing circuitry adapted and configured to harvest power from the HVAC triggering circuit; voltage measurement circuitry adapted and configured to make at least one electrical measurement that is at least partially influenced by the amount of electrical current flowing through the call switch; and processing and control circuitry adapted and configured to control an amount of power that the thermostat harvests from the HVAC triggering circuit based at least in part on the measurement so as to reduce a likelihood of inadvertently switching the HVAC function on or off.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
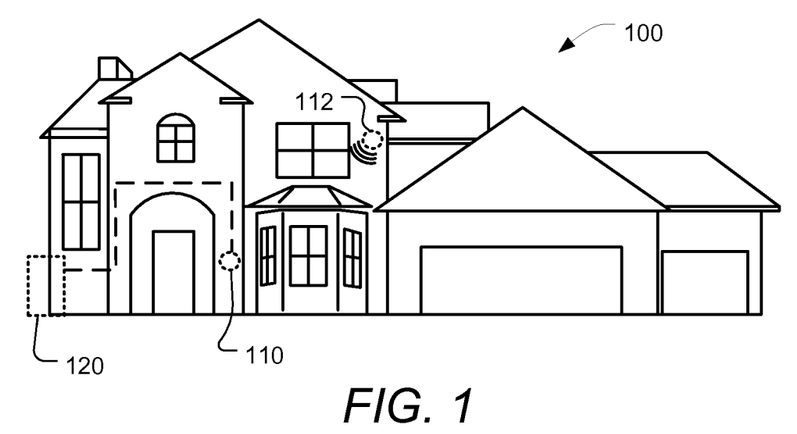
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112.

Figure 2:
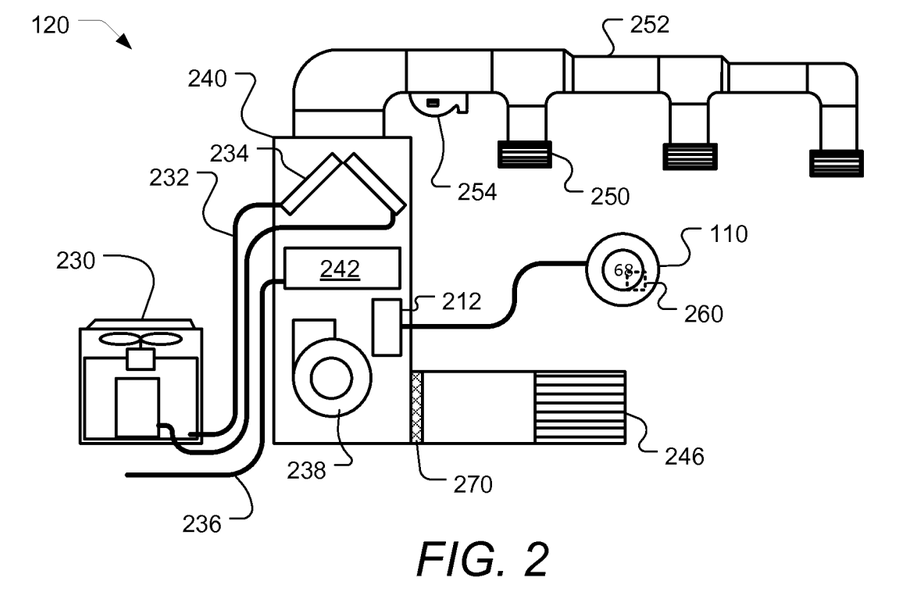
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such as Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
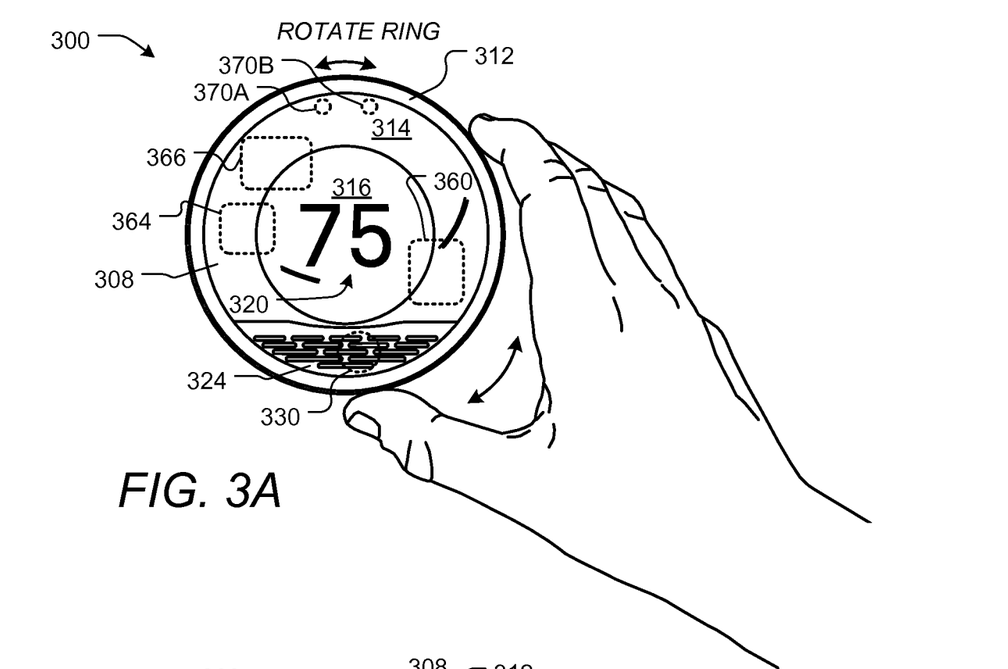
FIGS. 3A-B illustrate a thermostat having a user-friendly interface, according to some embodiments.
Figure 3B:
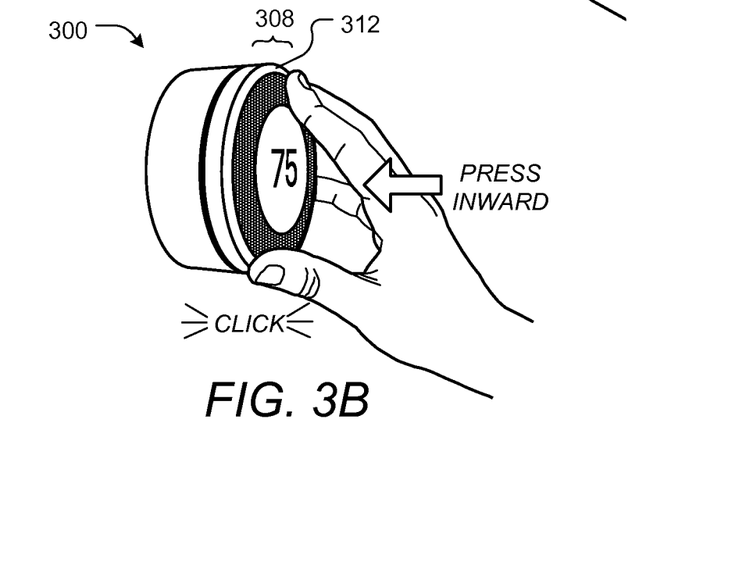

FIGS. 3A-B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over conventional designs by the design of thermostat 300. The thermostat 300 includes control circuitry and is electrically connected to an HVAC system, such as is shown with thermostat 110 in FIGS. 1 and 2. Thermostat 300 is wall mounted and has circular in shape and has an outer rotatable ring 312 for receiving user input. Thermostat 300 has a large frontal display area 314. According to some embodiments, thermostat 300 is approximately 80 mm in diameter. The outer rotating ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 that according to some embodiments is polycarbonate. Also within the rotating ring 312 is a metallic portion 324, preferably having a number of windows as shown. According to some embodiments, the surface of cover 314 and metallic portion 324 form a curved spherical shape gently arcing outward that matches a portion of the surface of rotating ring 312.

According to some embodiments, the cover 314 is painted or smoked around the outer portion, but leaving a central display 316 clear so as to facilitate display of information to users. According to some embodiments, the curved cover 314 acts as a lens that tends to magnify the information being displayed in display 316 to users. According to some embodiments central display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information is shown in FIG. 3A, which are central numerals 320. According to some embodiments, metallic portion 324 has number of openings so as to allow the use of a passive infrared motion sensor 330 mounted beneath the portion 324. The motion sensor as well as other techniques can be use used to detect and/or predict occupancy, as is described further in co-pending patent application U.S. Ser. No. 12/881,430, which is incorporated by reference herein. According to some embodiments, occupancy information is used in generating an effective and efficient scheduled program. According to some embodiments, proximity and ambient light sensors 370A and 370B are provided to sense visible and near-infrared light. The sensors 370A and 370B can be used to detect proximity in the range of about one meter so that the thermostat 300 can initiate "waking up" when a user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" input), and the second being an inward push on the upper cap 308 (FIG. 3B) until an audible and/or tactile "click" occurs (referenced hereafter as an "inward click" input). For further details of suitable user-interfaces and related designs, which are employed, according to some embodiments, see co-pending Patent Applications U.S. Ser. No. 13/033,573 and U.S. Ser. No. 29/386,021, both filed Feb. 23, 2011, and are incorporated herein by reference.

According to some embodiments, the thermostat 300 includes a processing system 360, display driver 364 and a wireless communications system 366. The processing system 360 is adapted to cause the display driver 364 and display area 316 to display information to the user, and to receiver user input via the rotating ring 312. The processing system 360, according to some embodiments, is capable of maintaining and updating a thermodynamic model for the enclosure in which the HVAC system is installed. For further detail on the thermodynamic modeling, see U.S. patent application Ser. No. 12/881,463 filed, which is incorporated by reference herein. According to some embodiments, the wireless communications system 366 is used to communicate with devices such as personal computers and/or other thermostats or HVAC system components.

Figure 4:
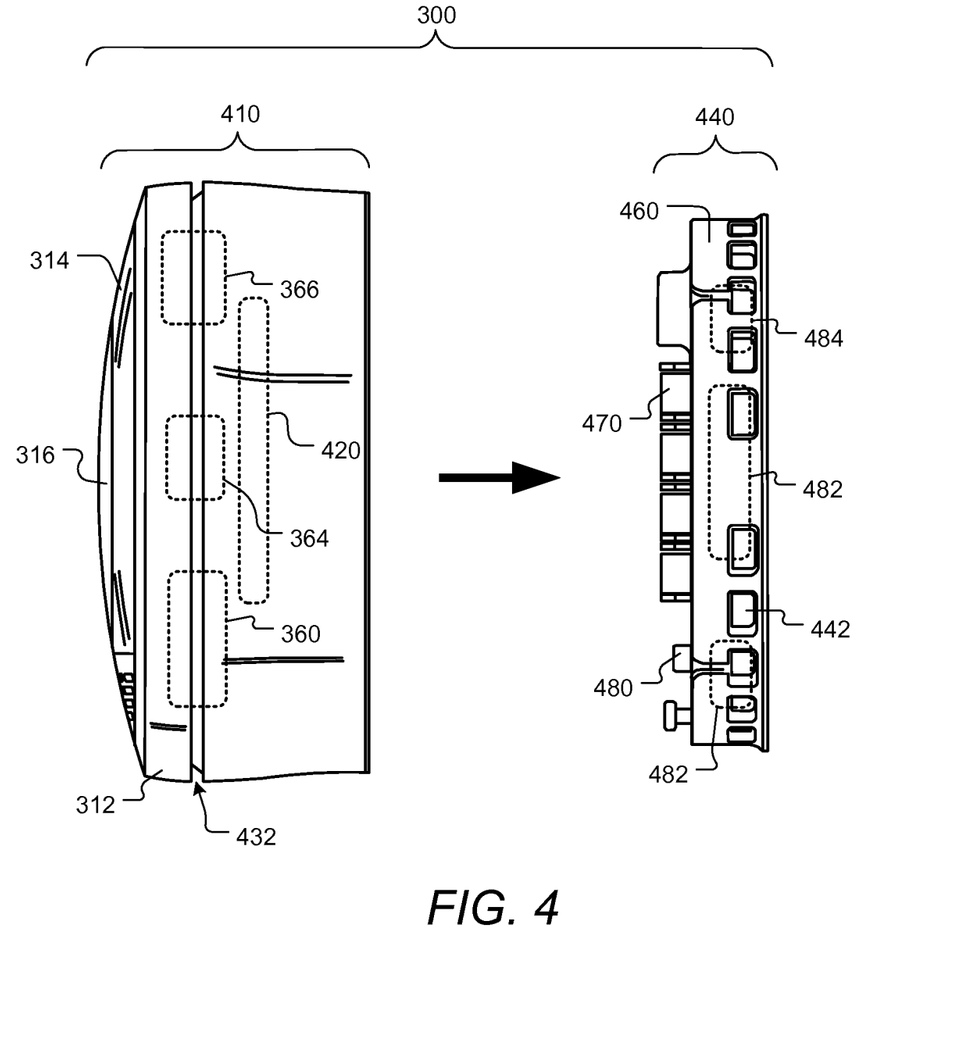
FIG. 4 illustrates a thermostat having a head unit and a backplate (or wall dock) for ease of installation, configuration and upgrading, according to some embodiments.

FIG. 4 illustrates a thermostat having a head unit and a backplate (or wall dock) for ease of installation, configuration and upgrading, according to some embodiments. As is described hereinabove, thermostat 300 is wall mounted and has circular in shape and has an outer rotatable ring 312 for receiving user input. Thermostat 300 has a cover 314 that includes a display 316. Head unit 410 of round thermostat 300 slides on to back plate 440. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein.

Backplate 440 includes electronics 482 and temperature sensor 484 in housing 460, which are ventilated via vents 442. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry. Based on features and configurations described in one or more of the commonly assigned incorporated applications, supra, the thermostat 300 is a multi-sensing network-connected self-learning device that is pleasing both to the eye and to the touch, and furthermore is advantageous in that it can provide its rich combination of capabilities and visually pleasing user interfaces without requiring a C-wire even though the requisite underlying device hardware can require instantaneous power draws greater than power-stealing can safely provide, at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. This can be contrasted with electronic thermostats that, if they were to provide a powerful display (for example), they would require the presence of a C-wire from the HVAC system (or line power from a household 110V source such as a wall plug), or else if they were indeed equipped to power-steal from the HVAC system, will have user interface displays (for example) that are made very low-power and less visually pleasing in order to keep the thermostat's instantaneous power usage within budget power-stealing levels at all times. Although applicable in a wide variety of other scenarios, the preferred embodiments described herein can be particularly advantageous when used in a device such as the multi-sensing network-connected self-learning thermostat 300 in that the relative amount of time spent in a battery-discharging state can be decreased in many cases, by virtue of the capability of safely detecting, without damage to equipment or unintentional call relay activation, whether a higher average amount of power stealing can be achieved, and in turn the statistical amount of decreased battery-discharging can provide advantages such as increased design margins, extensions in the average service life of the rechargeable battery, and increased statistical device reliability.

Figure 5A:
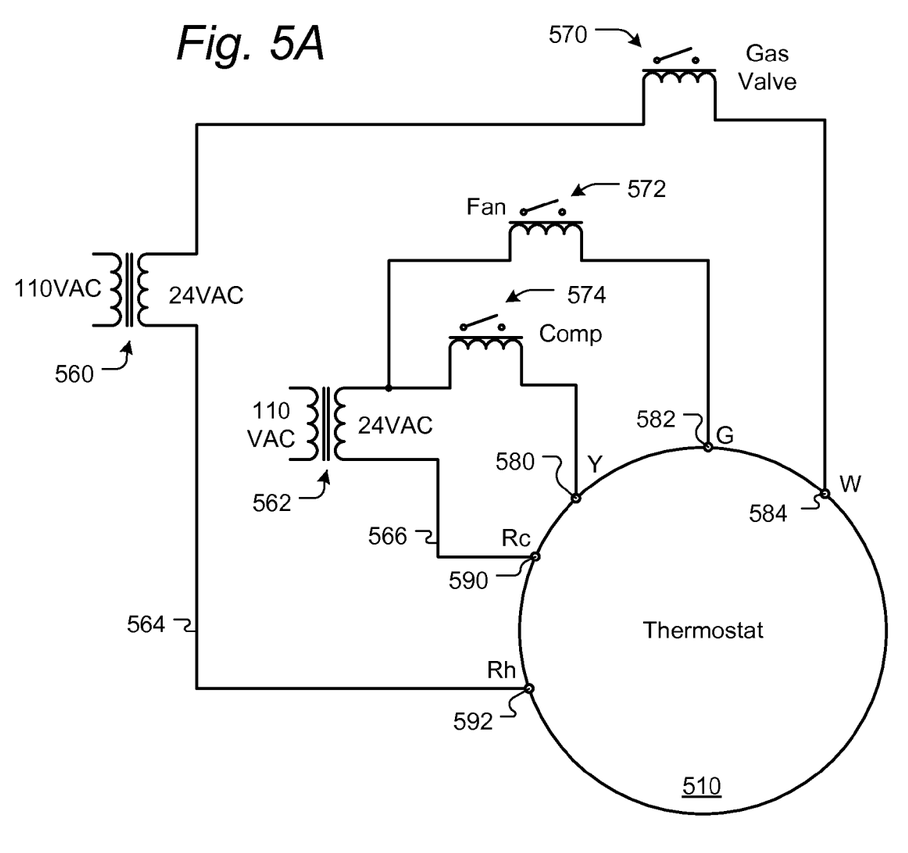
FIGS. 5A-B are block diagrams showing a thermostat wired to an HVAC system, according to some embodiments.
Figure 5B:
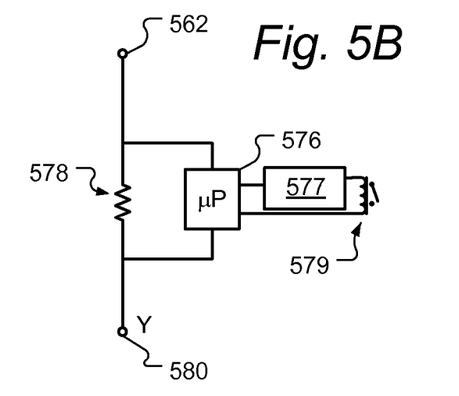

FIGS. 5A-B are block diagrams showing a thermostat wired to an HVAC system, according to some embodiments. FIG. 5A shows an adaptive power stealing thermostat 510 wired for control to an HVAC system having two power transformers 560 and 562. A two-transformer HVAC system is commonly found in residences and light commercial buildings in which an existing heating system was subsequently upgraded or had had an air conditioning system installed. Heat power transformer 560 converts 110 volt AC power to 24 volt AC power for the heating control circuit 564. Similarly, cooling power transformer 562 converts 110 volt AC power to 24 volt AC power for the cooling control circuit 566. Note that the 110 or 24 volt levels could be different, depending on the location of the building and/or what types of power is available. For example, the 110 volts could be 220 or 240 volts in some geographic locations.

Relay 570 controls the gas valve for the HVAC heating system. When sufficient AC current flows through the gas valve relay 570, gas in the heating system is activated. The gas valve relay 570 is connected via a wire to terminal 584, which is labeled the "W" terminal, on thermostat 510. Relay 572 controls the fan for the HVAC heating and cooling systems. When sufficient AC current flows through the fan relay 572, the fan is activated. The fan relay 572 is connected via a wire to terminal 582, which is labeled the "G" terminal on thermostat 510. Contactor (or relay) 574 controls the compressor for the HVAC cooling system. When sufficient AC current flows through the compressor contactor 574, the compressor is activated. The contactor 574 is connected via a wire to terminal 580, which is labeled the "Y" terminal, on thermostat 510. The heat power transformer 560 is connected to thermostat 510 via a wire to terminal 592, which is labeled the "Rh" terminal. The cooling power transformer 562 is connected to thermostat 510 via a wire to terminal 590, which is labeled the "Rc" terminal. Further details of HVAC wiring, switching, and power stealing that can be used in combination many of the embodiments described herein are discussed in co-pending applications U.S. Ser. No. 13/034,666, U.S. Ser. No. 13/034,674 and U.S. Ser. No. 13/034,678 which are incorporated herein by reference.

Note that the thermostat 510 can also be wired to control an HVAC system having a single power transformer. In this case, relays 570, 572 and 574, which control the gas valve, fan and the compressor, respectively, are all attached to a single transformer. The power transformer is connected to thermostat 510 via a single return wire (e.g. labeled "R", "Rc" or "Rh").

FIG. 5B shows a common alternative to a relay or contactor in HVAC systems that use a micro controller. Instead of using a relay or contactor to turn on the HVAC function (which in this case is the cooling function) a voltage drop across a resistor 578 is detected by microcontroller 576. The micro controller 576 then activates relays or other switches according to a timing program or other program. For example, controller 576 can activate the compressor using a relay driver 577 to activate relay 579.

In power stealing by thermostat 510 when the HVAC system is in-active (i.e., the HVAC function is not being called for by the thermostat) the thermostat must harvest power from one or more of the control circuits 564 and/or 566 such that the relay or microcontroller does not "notice" the current being drawn.

Figure 6:
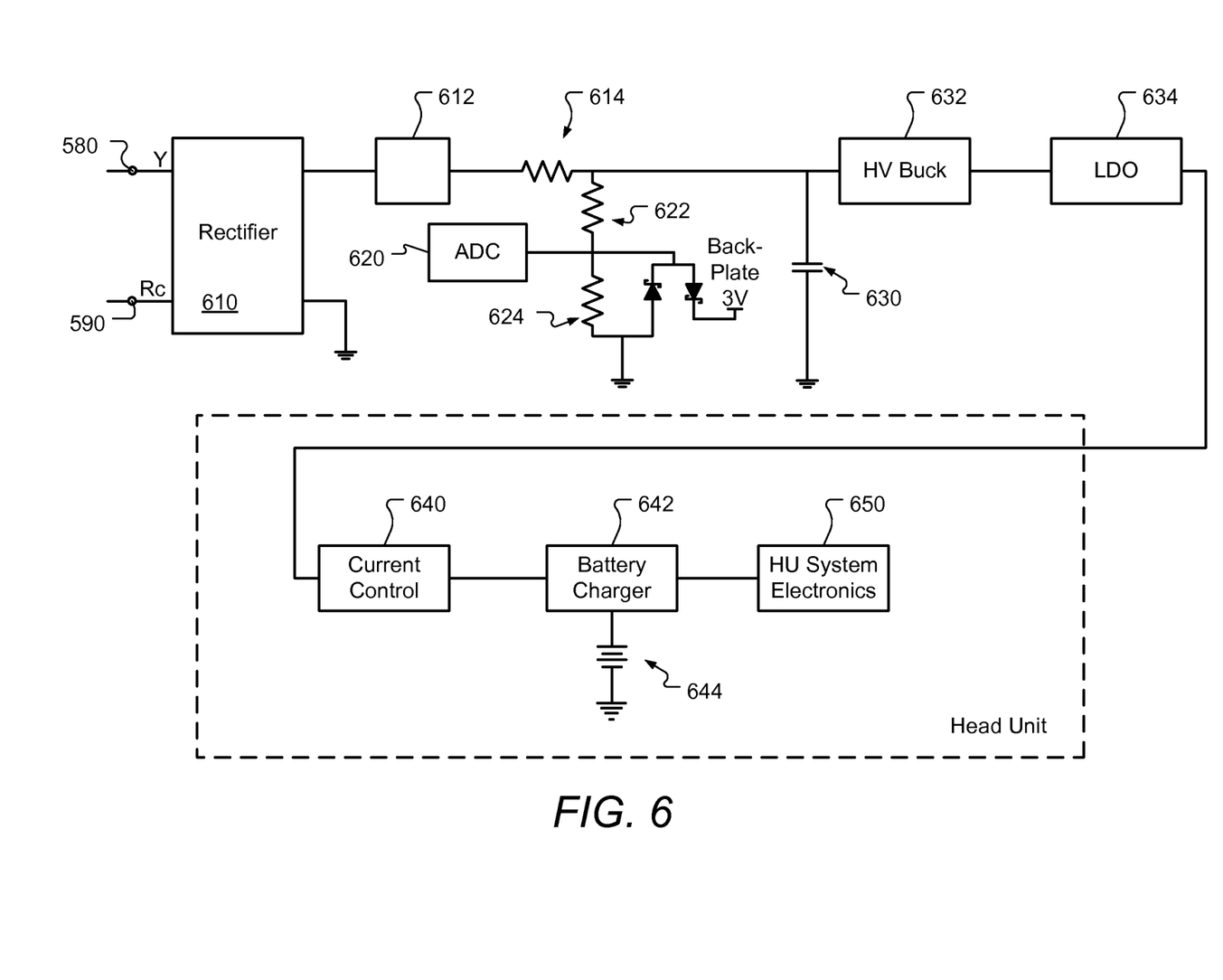
FIG. 6 is a block diagram showing thermostat electronics for adaptive power stealing, according to some embodiments.

FIG. 6 is a block diagram showing thermostat electronics for adaptive power stealing, according to some embodiments. In the example shown, power is being harvested from the HVAC cooling circuit, although according to other embodiments the power can harvested from one or more other control circuits, such as the heating and/or fan control circuit. In accordance with the basic functionality of a thermostat, there is a switch (not shown in FIG. 6) in the thermostat 510 that is disposed between nodes 580 and 590, this switch being "open" when the HVAC cooling circuit is "inactive" (i.e., the thermostat is not calling for the HVAC cooling function) and being normally "closed" when the HVAC cooling circuit is "active" (i.e., the thermostat is calling for the HVAC cooling function). The power stealing circuit of FIG. 6 is capable of carrying out power stealing during both the "inactive" and "active" time periods. During an "inactive" time period, i.e. when the switch (not shown) between nodes 580 and 590 is open, alternating current from the HVAC control circuit flows into the circuit of FIG. 6 across terminals Y (580) and Rc (590) where it is first rectified, preferably full-wave, by rectifier 610. The rectified signal passes through a slew rate limiter 612, which is used to smooth out any current spikes. Such current spikes, if not reduced or eliminated, passing the circuitry including capacitor 630 could have undesirable effects such as activating the HVAC control relay or burning fuses. After the slew rate limiter 612 the rectified signal passes through anti surge resistor 614 and then on to high voltage buck converter 632, which steps down the voltage to a level suitable for use by digital circuitry within the thermostat. Capacitor(s) 630 are used as a charge reservoir in between alternating current cycles when performing power stealing from the "inactive" HVAC circuit. During an "active" time period, the capacitor(s) 630 are still used as a charge reservoir, although the mechanism by which charge flows into the charge reservoir is somewhat different. In particular, during the "active" time period, i.e. when the switch (not shown) between nodes 580 and 590 is closed (or, more specifically, is effectively closed), power stealing from the HVAC control circuit is carried out by momentarily opening the switch (not shown) between nodes 580 and 590 for brief intervals, which will in turn supply a corresponding brief interval of incoming current that will serve to re-charge the capacitor(s) 630. The time during which the switch (not shown) between nodes 580 and 590 is closed is kept short enough that the HVAC relay, contactor, or microcontroller (e.g. relay 574 or microcontroller 576 in FIGS. 5A and 5B, respectively) do not "notice" and therefore the HVAC function is not interrupted.

According to some embodiments, a voltage measurement is made by an analog-to-digital converter 620 across a voltage divider made up of resistors 622 and 624 as shown in FIG. 6.

The voltage measurement by ADC 620, as is described in greater detail herein, is used to select an appropriate level of current to draw during power stealing.

Following the high voltage buck converter 632, the signal passes through a low-dropout voltage regulator (LDO) 634 followed by a current controller 640, battery charger 642 and on to other system electronics 650. Battery charger 642 also charges the re-chargeable battery 644. According to some embodiments, the circuitry shown within the dashed line is located on the head unit of the thermostat 510 while the remaining circuitry is located on the backplate. The current controller 640 is used to select from multiple levels of current to the battery charger 642. According to some embodiments, the current control circuitry can selectively draw 0 mA, 8 mA, 20 mA, 40 mA or 100 mA depending on conditions. According to some embodiments 100 mA is only drawn when there is a common wire ("C-wire") power supply available. Current controller 640 can thus be used to draw an amount of current during power stealing that has been determined to be safe, based on voltage measurements made by ADC 620, in terms of not undesirably activating the HVAC function when that function is inactive (i.e., not undesirably tripping the call relay), and not interrupting the HVAC function when that function is active (i.e., not undesirably un-tripping the call relay). According to some embodiments, two or more of the functional blocks shown in FIG. 6 can be implemented in on the same physical chip. For example, according to some embodiments, the current controller 640 and battery charger 642 are implemented in single chip. According to some embodiments, the post-regulating LDO 634 is not necessary, and the buck converter output 632 can connect directly to the current control input 640.

Figure 7:
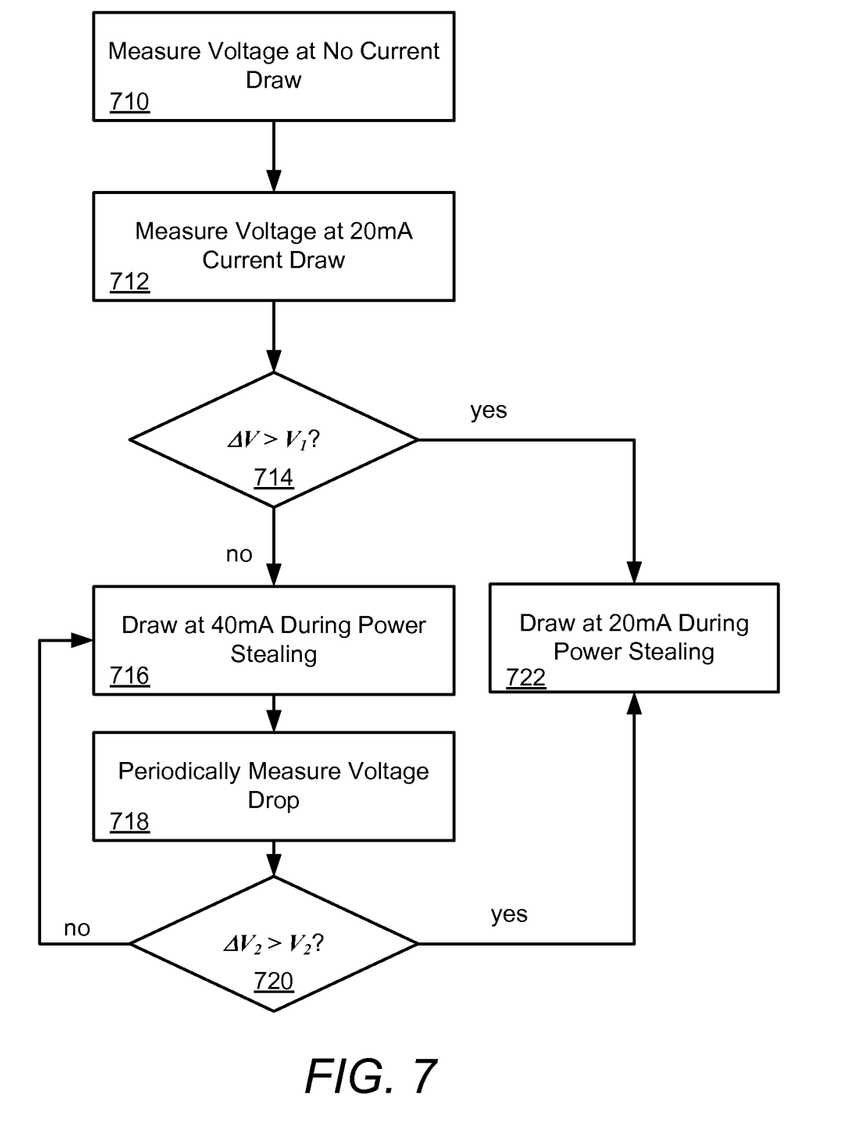
FIG. 7 is a flow chart showing steps in a two-level adaptive power-stealing thermostat, according to some embodiments.

FIG. 7 is a flow chart showing steps in a two-level adaptive power-stealing thermostat, according to some embodiments. In step 710 the voltage is measured when no current is being drawn by the thermostat, and the HVAC function (e.g. cooling or heating) is in-active (i.e. not being called for). According to the embodiments associated with FIG. 6, the voltage is measured by ADC 620 as described. However, according to other embodiments, the voltage can be measured at other locations depending upon the particular design of the power-stealing circuitry, as will be apparent to those skilled in the art. In step 712 the voltage is measured when the thermostat is drawing 20 mA of current. In the embodiments associated with FIG. 6, the current draw is controlled by current controller 640. However, according to other embodiments, the current can be controlled using other means and depending upon the particular design of the power-stealing circuitry, as will be apparent to those skilled in the art. At step 714, if the difference in voltage $\Delta V$ as measured in steps 710 and 712 is greater than a first threshold voltage $V_1$, then in step 722 the current controller 640 is programmed to draw 20 mA during power-stealing when the HVAC function is in-active. If the $\Delta V$ does not exceed $V_1$, then in step 716 the current controller 640 is programmed to draw 40 mA during power-stealing when the HVAC function is in-active. In step 718, if 40 mA is being drawn, the voltage is periodically measured (such by ADC 620 in FIG. 6), a second voltage drop $\Delta V_2$ is calculated between the voltage levels when no current is being drawn and when 40 mA is being drawn. In step 720, since 40 mA is twice 20 mA, we expect the voltage difference $\Delta V_2$ to be about twice $\Delta V$, so the threshold $V_2$ is set to be about twice $V_1$. Similarly, we expect the $\Delta V_2$ to be less than a second threshold, $V_2$. However, steps 718 and 720 are periodically performed, according to some embodiments, as a safety check. For example other variations in the system can affect the voltage drop, such as variations in the overall supply current (e.g. the 110 VAC supply at transformer 562 in FIG. 5). If, unexpectedly, $\Delta V_2$ is greater than a second threshold, $V_2$, then in step 722, the current controller is re-programmed to draw only 20 mA. According to some embodiments, threshold $V_1$ could be 4V and threshold $V_2$ could be 8V.

Figure 8:
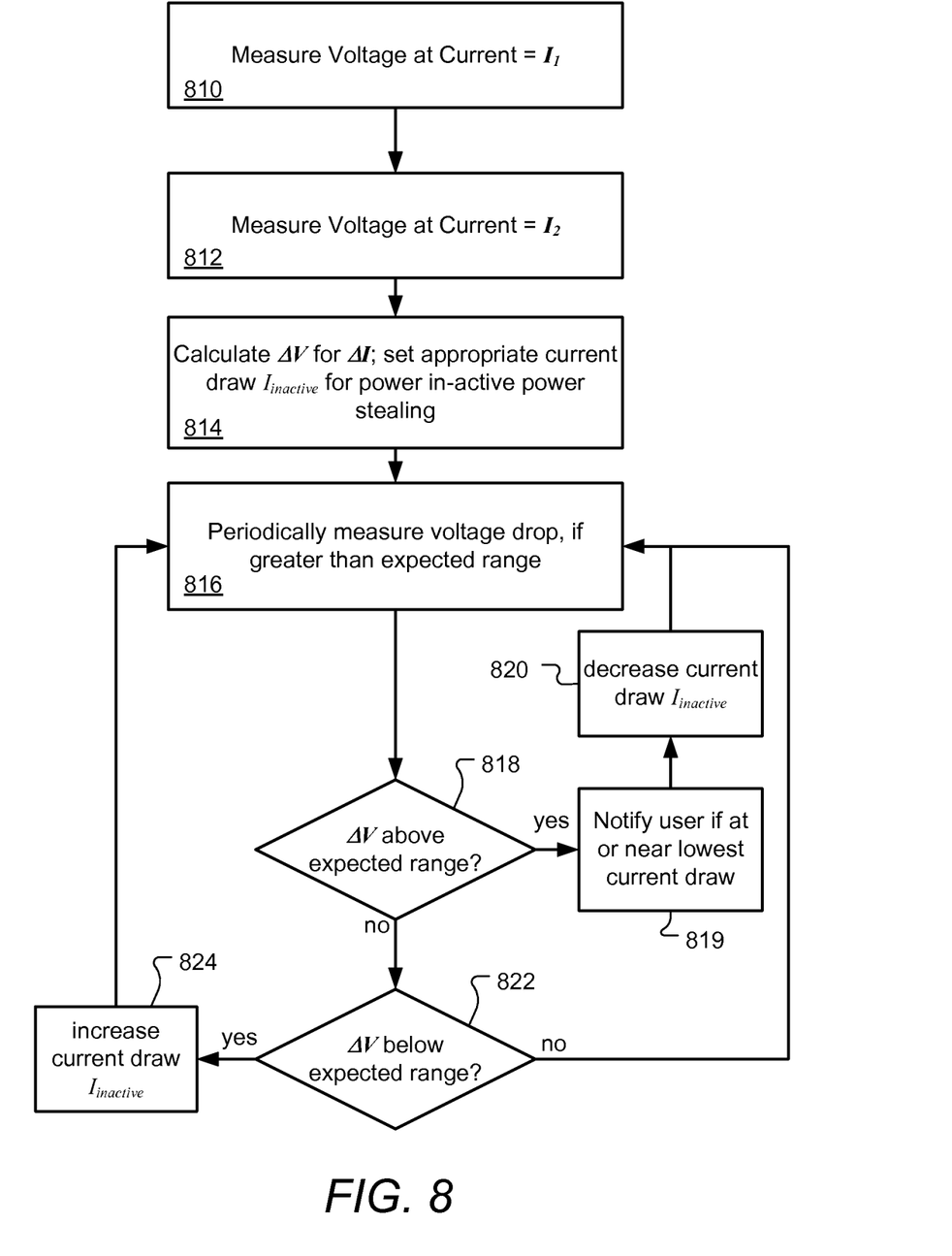
FIG. 8 is a flow chart showing steps in a multi-level or continuous adaptive power-stealing thermostat, according to some embodiments.

FIG. 8 is a flow chart showing steps in a multi-level or continuous adaptive power-stealing thermostat, according to some embodiments. The steps shown in FIG. 7 are for a relatively simple method in which there are only two-levels of current to choose between, namely 20 mA and 40 mA, based on the voltage measurements when different known currents are being drawn. According to some embodiments, more than two levels of power stealing can be implemented as shown in FIG. 8. In steps 810 and 812, just as in steps 710 and 712 of FIG. 7, a voltage is measured while drawing two amounts of current to establish a $\Delta V$ for a $\Delta I$. For example, I can be 0 mA as in step 710, but according to some embodiments $I_1$ and $I_2$ can be any two different known levels of current and the measured $\Delta V$ is used to determine an estimated value in step 816 for the resistance R for the HVAC relay, contactor (such as shown in FIG. 5A) or detector circuit (such as shown in FIG. 5B) using the relationship V=IR. Using the value for R, an appropriate current draw for in-active power stealing ($I_{inactive}$) can be set which will not (or is extremely unlikely to) activate the HVAC function.

According to some embodiments, the threshold value for R is not calculated, but instead a threshold $\Delta V$ is used which should not be exceeded for a known $\Delta I$. Further, the tolerable values for $\Delta V$ depend greatly on the thermostat hardware design and particularly on the power stealing circuitry design. Preferably, the appropriate current draw is empirically determined for different measured $\Delta V$ or calculated R values by testing carried out on a wide variety of HVAC systems in which the thermostat is likely to be installed. Because of the difference in hardware designs and also the difference in locations and method of measurement, it is difficult to compare empirically determined threshold values for different thermostats. However, it has been found for residential and light commercial HVAC systems, according to some embodiments, that the equivalent voltage drop across the HVAC relay or relay equivalent (e.g. relay 574 in FIG. 5A or resistor 578 in FIG. 5B, in the case of power stealing from a cooling control circuit) should be less than about 8 $V_{RMS}$. Even more preferably, for residential and light commercial HVAC systems, it has been found that the equivalent voltage drop across the HVAC relay or relay equivalent should be less than about 6 $V_{RMS}$ for power stealing when the HVAC function is inactive. According to a preferred embodiment, the equivalent voltage drop across the HVAC relay or relay equivalent is maintained at less than 5.5 $V_{RMS}$ for power stealing when the HVAC function is inactive.

In step 816, the voltage drop is periodically measured to check if it is greater than expected, or greater than the predetermined threshold. In step 818, if the voltage drop is greater than the expected range, then in step 820 the current draw for power stealing is decreased. On the other hand, in step 822 if the voltage drop is lower than an expected range, then greater amounts of power can be safely harvested from the HVAC control circuit without risk of triggering the HVAC relay or relay equivalent. In this case, in step 824, the current draw for power stealing is increased. According to some embodiments, an additional step 819 can be added in cases where it is determined that even drawing current at the lowest rate still causes too great of a voltage drop. In such cases the user is alerted that to continue use of the thermostat either a common wire needs to be added, or some other wiring change such as adding a resistor on the furnace control board.

Although many of the embodiments have been described with respect to controlling power harvesting while the HVAC function is in-active, according to some embodiments the same or similar techniques are used to control the amount of power harvested when the HVAC function is active, so as to reduce the likelihood of inadvertently switching the HVAC function off. For example, according to some embodiments, the control takes into account one or more factors such as the voltage drop, the rate at which the capacitor(s) 630 charges, and the voltage the capacitor(s) 630 reaches for a fixed short period of open-switch time.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method for harvesting power from an HVAC triggering circuit that includes a call switch to turn on and turn off an HVAC function, the harvested power being used by a thermostat connected to the HVAC triggering circuit, the harvested power being harvested by a power harvesting circuit including an energy-storage element and a current controller, the method comprising:
   operating the current controller of the power harvesting circuit at a predetermined first setting associated with a first power level of the power harvesting circuit and at a predetermined second setting associated with a second, higher power level of the power harvesting circuit;
   making at least one first measurement corresponding to an amount of energy stored by the energy-storage element while said current controller is operated at said first setting;
   making at least one second measurement corresponding to an amount of energy stored by the energy-storage element while said current controller is operated at said second setting;
   determining that a difference between said at least one first measurement and said at least one second measurement is less than a first predetermined threshold; and
   responsive to said determining that said difference between said at least one first measurement and said at least one second measurement is less than said first predetermined threshold, operating the current controller of the power harvesting circuit at a predetermined third setting associated with a third power level of the power harvesting circuit that is higher than said second level;
   whereby an amount of power harvested from the HVAC triggering circuit by said thermostat is increased while at the same time a reduced likelihood of an inadvertent on or off switching of said HVAC function is maintained.

2. The method of claim 1, further comprising:
   making at least one third measurement corresponding to an amount of energy stored by the energy-storage element while said current controller is operated at said third setting;
   determining that a difference between said at least one second measurement and said at least one third measurement is greater than a second predetermined threshold; and
   responsive to said determining that said difference between said at least one second measurement and said at least one third measurement is greater than said second predetermined threshold, operating the current controller of the power harvesting circuit at said second setting associated with said second power level of the power harvesting circuit.

3. The method of claim 1, further comprising:
   making at least one third measurement corresponding to the amount of energy stored by the energy-storage element while said current controller is operated at said third setting;
   determining that a difference between said at least one second measurement and said at least one third measurement is less than a second predetermined threshold; and
   responsive to said determining that said difference between said at least one second measurement and said at least one third measurement is less than said second predetermined threshold, operating the current controller of the power harvesting circuit at a predetermined fourth setting associated with a fourth power level of the power harvesting circuit that is higher than said third level.

4. The method of claim 1, wherein said energy storage element comprises a capacitor in series between said current controller and a voltage rectifier circuit.

5. The method of claim 1, wherein said current controller is digitally controlled by a processor.

6. The method of claim 1, wherein said first predetermined threshold is programmed into said current controller.

7. The method of claim 1, wherein said first predetermined threshold is determined in advance by empirical testing of various HVAC systems.

8. The method of claim 1, wherein said at least one first measurement comprises a digital voltage measurement of said energy-storage element.

9. A thermostat comprising:
   an HVAC triggering circuit comprising a call switch to turn on and turn off an HVAC function;
   a power harvesting circuit comprising:
      a current controller configured to operate at:
         a predetermined first setting associated with a first power level of the power harvesting circuit; and
         a predetermined second setting associated with a second, higher power level of the power harvesting circuit; and
      an energy-storage element;
   a measurement circuit configured to:
      make at least one first measurement corresponding to an amount of energy stored by the energy-storage element while said current controller is operated at said first setting; and
      make at least one second measurement corresponding to an amount of energy stored by the energy-storage element while said current controller is operated at said second setting; and
   a processor programmed to:
      determine that a difference between said at least one first measurement and said at least one second measurement is less than a first predetermined threshold; and
      responsive to said determining that said difference between said at least one first measurement and said at least one second measurement is less than said first predetermined threshold, cause the current controller of the power harvesting circuit to operate at a predetermined third setting associated with a third power level of the power harvesting circuit that is higher than said second level;
      whereby an amount of power harvested from the HVAC triggering circuit by said thermostat is increased while at the same time a reduced likelihood of an inadvertent on or off switching of said HVAC function is maintained.

10. The thermostat of claim 9, wherein:

the measurement circuit is further configured to make at least one third measurement corresponding to an amount of energy stored by the energy-storage element while said current controller is operated at said third setting; and the processor is further programmed to:
 determine that a difference between said at least one second measurement and said at least one third measurement is greater than a second predetermined threshold; and
 responsive to said determining that said difference between said at least one second measurement and said at least one third measurement is greater than said second predetermined threshold, cause the current controller of the power harvesting circuit to operate at said second setting associated with said second power level of the power harvesting circuit.

11. The thermostat of claim 9, wherein:

the measurement circuit is further configured to make at least one third measurement corresponding to the amount of energy stored by the energy-storage element while said current controller is operated at said third setting; and the processor is further programmed to:
 determine that a difference between said at least one second measurement and said at least one third measurement is less than a second predetermined threshold; and
 responsive to said determining that said difference between said at least one second measurement and said at least one third measurement is less than said second predetermined threshold, cause the current controller of the power harvesting circuit to operate at a predetermined fourth setting associated with a fourth power level of the power harvesting circuit that is higher than said third level.

12. The thermostat of claim 9, further comprising a voltage rectifier circuit, wherein:

said energy storage element comprises a capacitor in series between said current controller and a voltage rectifier circuit.

13. The thermostat of claim 9, wherein said first predetermined threshold is programmed into said current controller.

14. The thermostat of claim 9, wherein said first predetermined threshold is determined in advance by empirical testing of various HVAC systems.

15. The thermostat of claim 9, wherein said at least one first measurement comprises a digital voltage measurement of said energy-storage element.

\* \* \* \* \*